(12) United States Patent
Aoyagi

(10) Patent No.: US 11,698,668 B2
(45) Date of Patent: Jul. 11, 2023

(54) INFORMATION PROCESSING APPARATUS AND CONTROL METHOD FOR SELECTIVELY SUPPLYING POWER AND CLOCKS TO MODULE CIRCUITS USED FOR VERIFICATION

(71) Applicant: CANON KABUSHIKI KAISHA, Tokyo (JP)

(72) Inventor: Takeshi Aoyagi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/067,224

(22) Filed: Oct. 9, 2020

(65) Prior Publication Data
US 2021/0116980 A1 Apr. 22, 2021

(30) Foreign Application Priority Data

Oct. 16, 2019 (JP) .................................. 2019-189652

(51) Int. Cl.
*G06F 1/26* (2006.01)
*G06F 1/10* (2006.01)
*G06F 1/3287* (2019.01)
*G06F 1/3237* (2019.01)
*G06F 21/57* (2013.01)
*G06F 9/4401* (2018.01)
*G06F 1/3296* (2019.01)

(52) U.S. Cl.
CPC .................. *G06F 1/26* (2013.01); *G06F 1/10* (2013.01); *G06F 1/3237* (2013.01); *G06F 1/3287* (2013.01); *G06F 1/3296* (2013.01);

*G06F 9/4406* (2013.01); *G06F 21/572* (2013.01); *G06F 21/575* (2013.01)

(58) Field of Classification Search
CPC .... G06F 9/4406; G06F 21/575; G06F 9/4401; G06F 1/3287; G06F 21/572; G06F 1/26; G06F 1/3296; G06F 1/3237; G06F 1/10
USPC ........................ 713/2, 187, 322, 324; 726/26
See application file for complete search history.

(56) References Cited

U.S. PATENT DOCUMENTS

| | | | |
|---|---|---|---|
| 9,836,637 B2* | 12/2017 | Merrell | G06F 21/32 |
| 2018/0253556 A1* | 9/2018 | Karaginides | G06F 21/44 |
| 2020/0151334 A1* | 5/2020 | Aoyagi | H04N 1/0088 |
| 2020/0151336 A1* | 5/2020 | Maletsky | G06F 21/572 |

FOREIGN PATENT DOCUMENTS

JP 2017-033248 A 2/2017

* cited by examiner

*Primary Examiner* — Ji H Bae
(74) *Attorney, Agent, or Firm* — Canon U.S.A., Inc. IP Division

(57) ABSTRACT

A power supply control unit controls supply and stoppage of power to a plurality of blocks having two or more modules. A clock control unit controls supply and stoppage of clocks to the two or more modules in the plurality of blocks. A first control unit verifies validity of a program stored in a storage unit. A second control unit executes the program determined to be valid as a result of verification by the first control unit. While the program is verified by the first control unit, the power supply control unit supplies power to a block including a module required for the verification, and the clock control unit stops a clock to a module not required for the verification of the block including a module required for the verification.

18 Claims, 10 Drawing Sheets

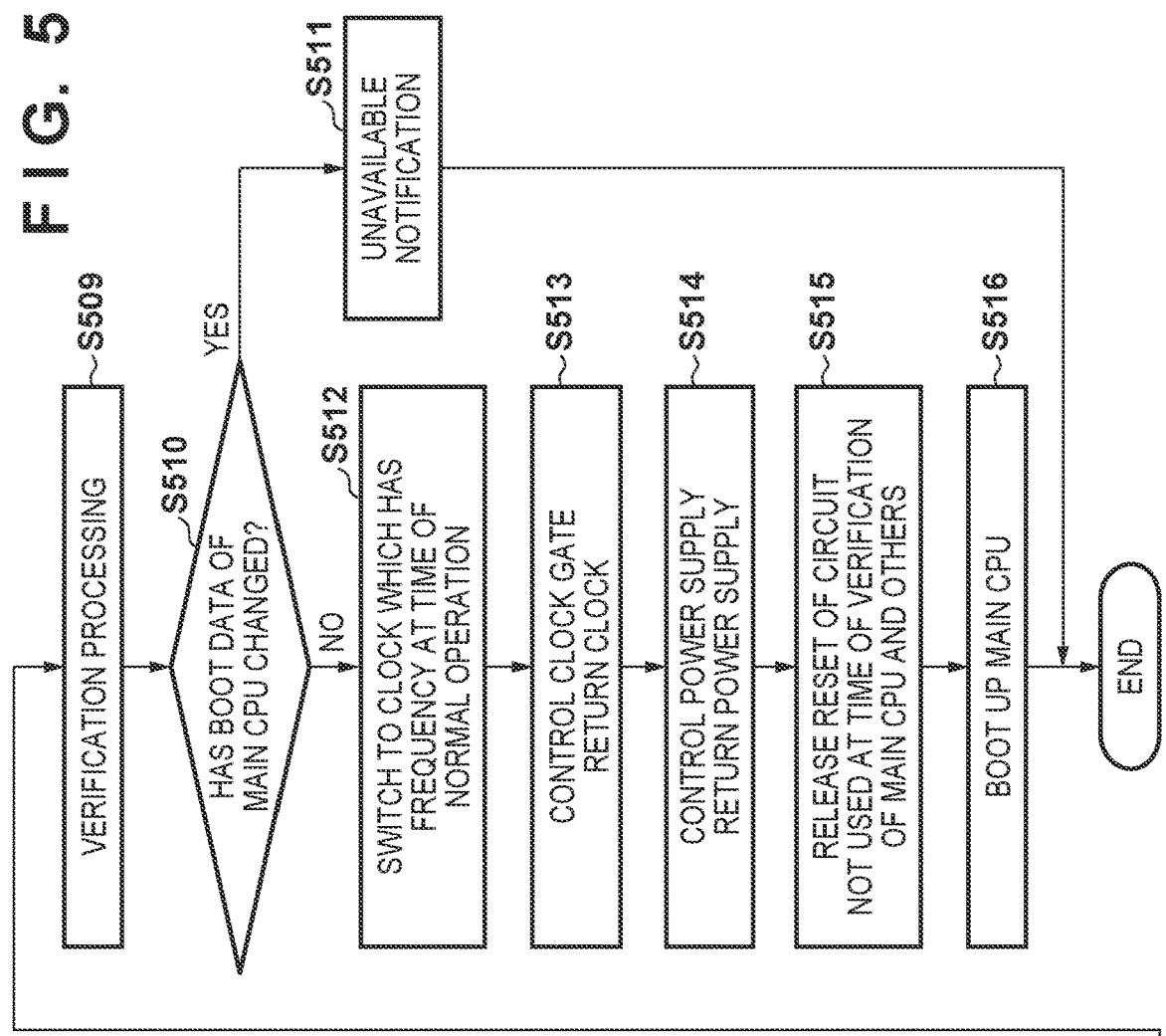
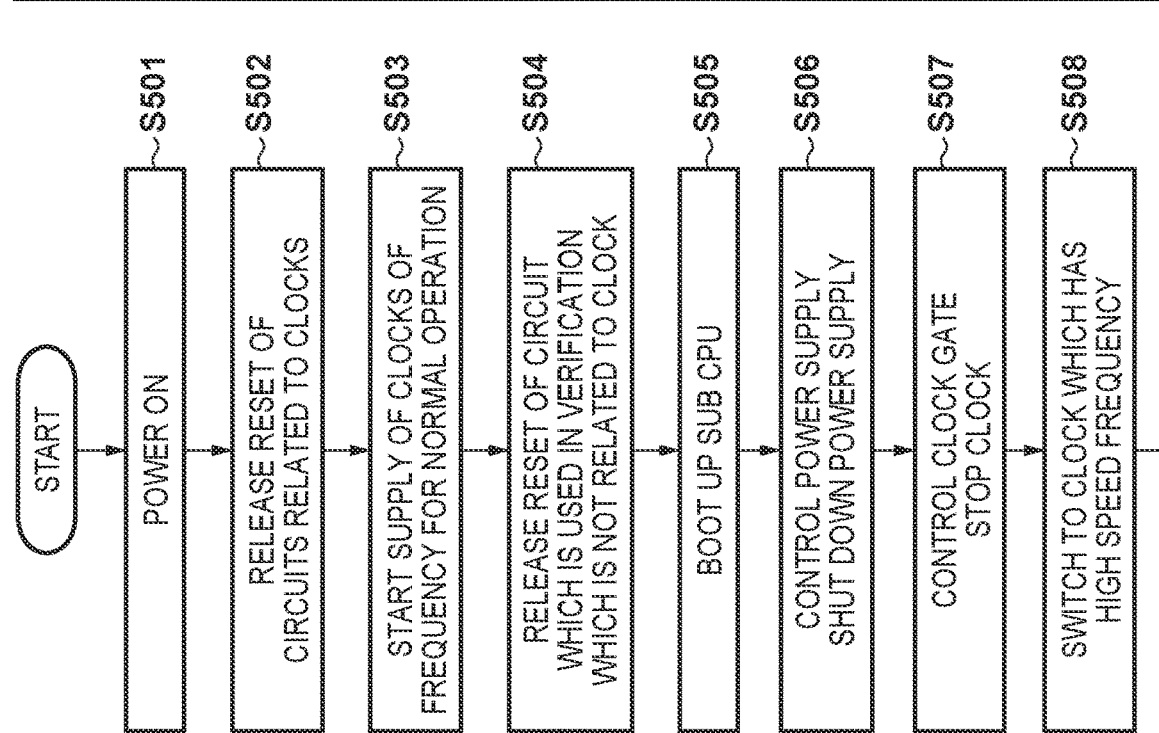
FIG. 5

FIG. 6

| MODULE | CLOCK TYPE | FREQUENCY (MHz) | CIRCUIT SIZE (K GATE) | POWER CONSUMPTION AT TIME OF DATA PROCESSING (mW) |
|---|---|---|---|---|
| DATA PROCESSING UNIT 1 | CLK-A | 100 | 100 | 1,000 |
| MODULE 1 | CLK-B | 100 | 50 | 500 |
| MODULE 2 | CLK-C | 50 | 500 | 2,500 |
| MEMORY I/F 1 | CLK-D | 50 | 5 | 25 |
| MEMORY I/F 2 | CLK-E | 50 | 5 | 25 |
| MEMORY I/F 3 | CLK-F | 50 | 50 | 250 |
| MAIN CPU | CLK-G | 150 | 180 | 2,700 |
| SUB CPU | CLK-H | 100 | 100 | 1,000 |
| CLOCK CONTROL UNIT | CLK-I | 100 | 5 | 50 |
| RESET CONTROL UNIT | CLK-OSC | 10 | 1 | 1 |
| CLOCK GENERATOR | CLK-OSC | 10 | 1 | 1 |
| POWER SUPPLY CONTROL UNIT | CLK-OSC | 10 | 1 | 1 |
| TOTAL POWER CONSUMPTION (mW) | | | | 8,053 |

FIG. 7

| MODULE | CLOCK TYPE | FREQUENCY (MHz) | CIRCUIT SIZE (K GATE) | POWER CONSUMPTION OF CIRCUIT USED AT TIME OF VERIFICATION (mW) | POWER CONSUMPTION OF CIRCUIT NOT USED AT TIME OF VERIFICATION (mW) | STATE OF CIRCUIT NOT USED AT TIME OF VERIFICATION |
|---|---|---|---|---|---|---|
| DATA PROCESSING UNIT 1 | CLK-A | 100 | 100 | | 0 | SHUT DOWN POWER SUPPLY |
| MODULE 1 | CLK-B | 100 | 50 | 500 | | |
| MODULE 2 | CLK-C | 50 | 500 | | 1,250 | THERE IS SUPPLY OF CLOCKS |
| MEMORY I/F 1 | CLK-D | 50 | 5 | 25 | | |
| MEMORY I/F 2 | CLK-E | 50 | 5 | 25 | | |
| MEMORY I/F 3 | CLK-F | 50 | 50 | | 125 | THERE IS SUPPLY OF CLOCKS |
| MAIN CPU | CLK-G | 120 | 180 | | 0 | SHUT DOWN POWER SUPPLY |
| SUB CPU | CLK-H | 100 | 100 | 1,000 | | |
| CLOCK CONTROL UNIT | CLK-I | 100 | 5 | 50 | | |
| RESET CONTROL UNIT | CLK-OSC | 10 | 1 | 1 | | |
| CLOCK GENERATOR | CLK-OSC | 10 | 1 | 1 | | |
| POWER SUPPLY CONTROL UNIT | CLK-OSC | 10 | 1 | 1 | | |
| TOTAL POWER CONSUMPTION (mW) | | | | | 2,977 | |

FIG. 8

| MODULE | CLOCK TYPE | FREQUENCY (MHz) | CIRCUIT SIZE (K GATE) | POWER CONSUMPTION OF CIRCUIT USED AT TIME OF VERIFICATION (mW) | POWER CONSUMPTION OF CIRCUIT NOT USED AT TIME OF VERIFICATION (mW) | STATE OF CIRCUIT NOT USED AT TIME OF VERIFICATION |
|---|---|---|---|---|---|---|
| DATA PROCESSING UNIT 1 | CLK-A | 100 | 100 | | 0 | SHUT DOWN POWER SUPPLY |
| MODULE 1 | CLK-B | 400 | 50 | 2,000 | | |
| MODULE 2 | CLK-C | 50 | 500 | | 1,250 | THERE IS SUPPLY OF CLOCKS |
| MEMORY I/F 1 | CLK-D | 200 | 5 | 100 | | |
| MEMORY I/F 2 | CLK-E | 200 | 5 | 100 | | |
| MEMORY I/F 3 | CLK-F | 50 | 50 | | 125 | THERE IS SUPPLY OF CLOCKS |
| MAIN CPU | CLK-G | 120 | 180 | | 0 | SHUT DOWN POWER SUPPLY |
| SUB CPU | CLK-H | 400 | 100 | 4,000 | | |
| CLOCK CONTROL UNIT | CLK-I | 100 | 5 | 50 | | |
| RESET CONTROL UNIT | CLK-OSC | 10 | 1 | 1 | | |
| CLOCK GENERATOR | CLK-OSC | 10 | 1 | 1 | | |
| POWER SUPPLY CONTROL UNIT | CLK-OSC | 10 | 1 | 1 | | |
| TOTAL POWER CONSUMPTION (mW) | | | | | 7,627 | |

FIG. 9

| MODULE | CLOCK TYPE | FREQUENCY (MHz) | CIRCUIT SIZE (K GATE) | POWER CONSUMPTION OF CIRCUIT USED AT TIME OF VERIFICATION (mW) | POWER CONSUMPTION OF CIRCUIT NOT USED AT TIME OF VERIFICATION (mW) | STATE OF CIRCUIT NOT USED AT TIME OF VERIFICATION |
|---|---|---|---|---|---|---|
| DATA PROCESSING UNIT 1 | CLK-A | 100 | 100 | | 0 | SHUT DOWN POWER SUPPLY |
| MODULE 1 | CLK-B | 100 | 50 | 500 | | |
| MODULE 2 | CLK-C | 50 | 500 | | 125 | STOP CLOCK |
| MEMORY I/F 1 | CLK-D | 50 | 5 | 25 | | |
| MEMORY I/F 2 | CLK-E | 50 | 5 | 25 | | |
| MEMORY I/F 3 | CLK-F | 50 | 50 | | 12.5 | STOP CLOCK |
| MAIN CPU | CLK-G | 120 | 180 | 1,000 | 0 | SHUT DOWN POWER SUPPLY |
| SUB CPU | CLK-H | 100 | 100 | 50 | | |
| CLOCK CONTROL UNIT | CLK-I | 100 | 5 | 1 | | |
| RESET CONTROL UNIT | CLK-OSC | 10 | 1 | 1 | | |
| CLOCK GENERATOR | CLK-OSC | 10 | 1 | 1 | | |
| POWER SUPPLY CONTROL UNIT | CLK-OSC | 10 | 1 | 1 | | |
| TOTAL POWER CONSUMPTION (mW) | | | | | 1,739.5 | |

F I G. 10

| MODULE | CLOCK TYPE | FREQUENCY (MHz) | CIRCUIT SIZE (K GATE) | POWER CONSUMPTION OF CIRCUIT USED AT TIME OF VERIFICATION (mW) | POWER CONSUMPTION OF CIRCUIT NOT USED AT TIME OF VERIFICATION (mW) | STATE OF CIRCUIT NOT USED AT TIME OF VERIFICATION |
|---|---|---|---|---|---|---|
| DATA PROCESSING UNIT 1 | CLK-A | 100 | 100 | | 0 | SHUT DOWN POWER SUPPLY |
| MODULE 1 | CLK-B | 500 | 50 | 2,500 | | |
| MODULE 2 | CLK-C | 50 | 500 | | 125 | STOP CLOCK |
| MEMORY I/F 1 | CLK-D | 250 | 5 | 125 | | |
| MEMORY I/F 2 | CLK-E | 250 | 5 | 125 | | |
| MEMORY I/F 3 | CLK-F | 50 | 50 | | 12.5 | STOP CLOCK |
| MAIN CPU | CLK-G | 120 | 180 | | 0 | SHUT DOWN POWER SUPPLY |
| SUB CPU | CLK-H | 500 | 100 | 5,000 | | |
| CLOCK CONTROL UNIT | CLK-I | 100 | 5 | 50 | | |
| RESET CONTROL UNIT | CLK-OSC | 10 | 1 | 1 | | |
| CLOCK GENERATOR | CLK-OSC | 10 | 1 | 1 | | |
| POWER SUPPLY CONTROL UNIT | CLK-OSC | 10 | 1 | 1 | | |
| TOTAL POWER CONSUMPTION (mW) | | | | | | 7,939.5 |

INFORMATION PROCESSING APPARATUS AND CONTROL METHOD FOR SELECTIVELY SUPPLYING POWER AND CLOCKS TO MODULE CIRCUITS USED FOR VERIFICATION

BACKGROUND OF THE INVENTION

Field of the Invention

The present invention relates to an information processing apparatus that verifies validity of boot data at the time of activating a chip such as an ASIC or a CPU, and to a control method of the same.

Description of the Related Art

In recent years, security with respect to boot-up of a central processing unit (hereinafter referred to as a CPU) has been regarded as important. Therefore, boot-up of a main CPU of a system is performed after checking, by control of a sub CPU immediately after power-on, that boot data of the main CPU has not changed due to tampering or aging. Verification of such a change due to tampering or aging is collectively referred to as verification processing of validity below. Since the verification processing is basically processing performed at the time of power-on, it is desirable, taking into account user convenience, to complete the verification processing as soon as possible to reduce the power supply start-up time.

Japanese Patent Laid-Open No. 2017-033248 proposes a method for completing tampering detection processing in a short time by omitting tampering detection with respect to data that does not require verification.

However, the conventional technology described above has problems described below. For example, the conventional technology described above tends to apply a program that performs the verification processing of validity (tampering detection processing) not only to upstream software such as BIOS, but also to a downstream program such as an application, and tends to increase a data amount for performing the verification processing. In contrast, for example, a method including increasing a clock frequency in an operation at the time of the verification processing to complete the verification processing in a short time is also conceivable. However, to increase a clock frequency in an operation as much as possible within the range where allowable power of the chip is not exceeded, it is necessary to reduce power consumption as much as possible with respect to a circuit not used in the verification processing.

Although it is conceivable not to supply power by power shutdown as a method for reducing power consumption in an unused circuit, there is a limit in the number of controllable power blocks in a general power shutdown control circuit. Namely, there is a circumstance where power supply control cannot be performed with a fine granularity for each function module (circuit).

SUMMARY OF THE INVENTION

The present invention enables realization of a mechanism that reduces power consumption in verification processing by performing, with a fine granularity, clock stop control with respect to a circuit or the like not used in the verification processing.

One aspect of the present invention provides an information processing apparatus comprising: a storage unit that stores a program; a power supply control unit that controls supply and stoppage of power to a plurality of blocks having two or more modules; a clock control unit that controls supply and stoppage of clocks to the two or more modules in the plurality of blocks; a first control unit that verifies validity of a program stored in the storage unit; and a second control unit that executes the program determined to be valid as a result of verification by the first control unit, wherein while the program is verified by the first control unit, the power supply control unit supplies power to a block including a module required for verification by the first control unit, and the clock control unit stops a clock to a module not required for verification by the first control unit of the block including a module required for verification by the first control unit.

Another aspect of the present invention provides an information processing apparatus comprising: a storage unit, circuit, or device that stores a program; a clock control unit or circuit that controls supply and stoppage of clocks to two or more modules in a plurality of blocks having the two or more modules; a first control unit or circuit that verifies validity of a program stored in the storage unit; and a second control unit or circuit that executes the program determined to be valid as a result of verification by the first control unit, wherein while the program is verified by the first control unit, the clock control unit stops a clock to a module not required for verification by the first control unit of the block including a module required for verification by the first control unit.

Still another aspect of the present invention provides a control method of an information processing apparatus comprising: a storage unit, circuit, or device that stores a program; a power supply control unit or circuit that controls supply and stoppage of power to a plurality of blocks having two or more modules; a clock control unit or circuit that controls supply and stoppage of clocks to the two or more modules in the plurality of blocks; a first control unit or circuit that verifies validity of a program stored in the storage unit; and a second control unit or circuit that executes the program determined to be valid as a result of verification by the first control unit, the method comprising: while the program is verified by the first control unit, supplying, by the power supply control unit, power to a block including a module required for verification by the first control unit, and stopping, by the clock control unit, a clock to a module not required for verification by the first control unit of the block including a module required for verification by the first control unit.

Yet still another aspect of the present invention provides a control method of an information processing apparatus comprising: a storage unit, circuit, or device that stores a program; a clock control unit or circuit that controls supply and stoppage of clocks to two or more modules in a plurality of blocks having the two or more modules; a first control unit or circuit that verifies validity of a program stored in the storage unit; and a second control unit or circuit that executes the program determined to be valid as a result of verification by the first control unit, the method comprising: while the program is verified by the first control unit, stopping, by the clock control unit, a clock to a module not required for verification by the first control unit of the block including a module required for verification by the first control unit.

Further features of the present invention will become apparent from the following description of exemplary embodiments (with reference to the attached drawings).

BRIEF DESCRIPTION OF THE DRAWINGS

FIG. 5 is a detailed flowchart at the time of verification processing according to an embodiment.

FIG. 6 is a view illustrating power consumption of an ASIC 100 in a normal operation according to an embodiment.

FIG. 7 is a view illustrating power consumption of the ASIC 100 when power shutdown control is performed with respect to a circuit not used at the time of verification processing according to an embodiment.

FIG. 8 is a view illustrating power consumption of the ASIC 100 when power shutdown control is performed with respect to a circuit not used at the time of verification processing, and a frequency is increased with respect to a circuit used at the time of the verification processing according to an embodiment.

FIG. 9 is a view illustrating power consumption of the ASIC 100 when power shutdown control and clock stop control are performed with respect to a circuit not used at the time of verification processing according to an embodiment.

FIG. 10 is a view illustrating power consumption of the ASIC 100 when power shutdown control and clock stop control are performed with respect to a circuit not used at the time of verification processing, and a frequency is increased with respect to a circuit used at the time of the verification processing according to an embodiment.

DESCRIPTION OF THE EMBODIMENTS

Figure 1:
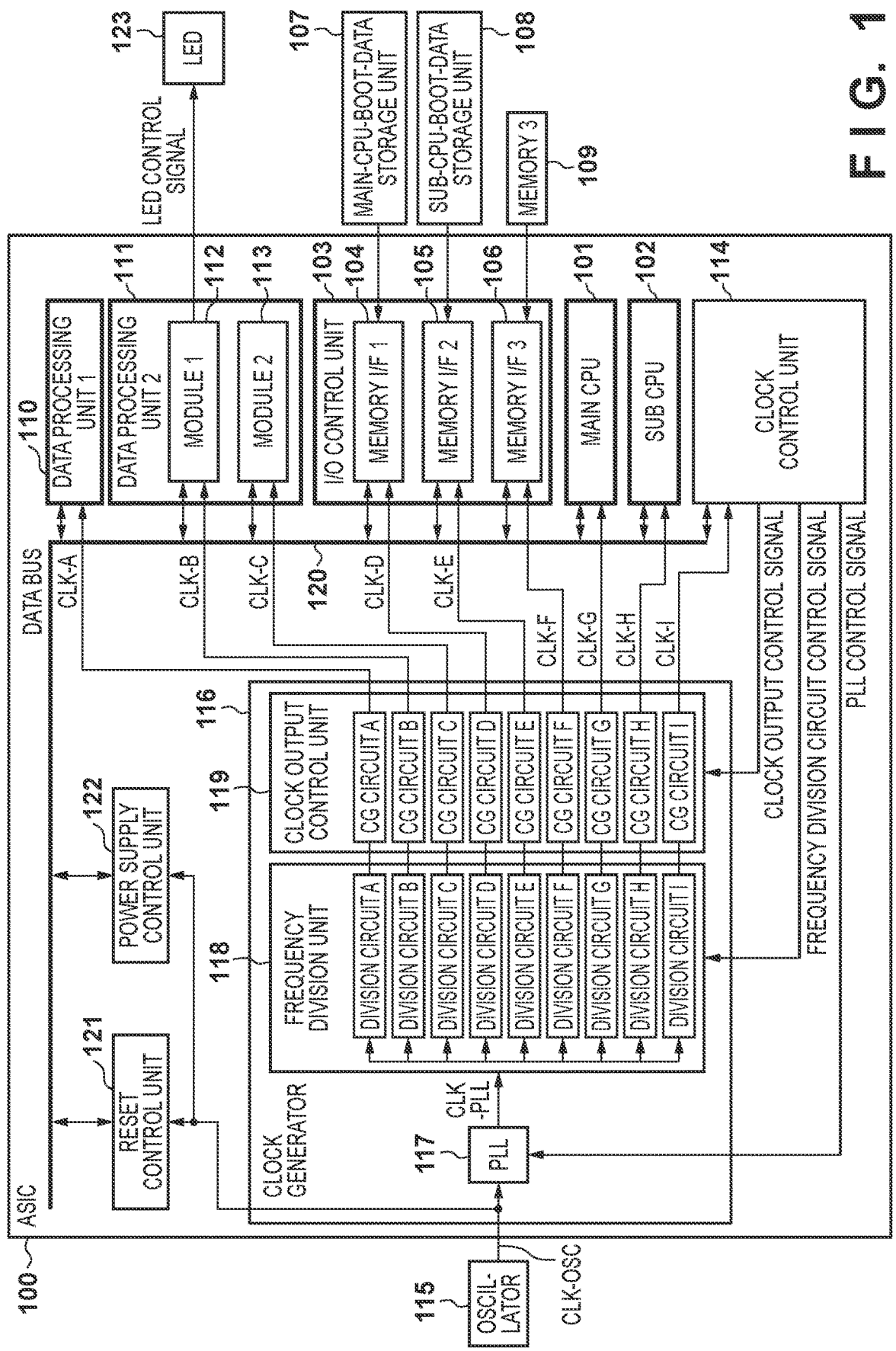
FIG. 1 is a block diagram illustrating a data processing system according to an embodiment.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

Configuration of Data Processing System

Embodiments of the present invention will be described below. First, a configuration example of a data processing system in the present embodiment will be described by referring to FIG. 1. The data processing system is a system characterized by performing verification processing of validity of boot data of a main CPU at the time of power-on, return-from-sleep or the like, and then executing a data processing operation. In the present embodiment, one information processing apparatus is described as an example of the data processing system. However, it is not intended to limit the present invention, and the data processing system may be configured as a system including a plurality of apparatuses.

An ASIC 100 is the center of an operation in the data processing system. A main CPU 101 (second control unit or circuit) performs main control of the data processing system. A sub CPU 102 (first control unit or circuit) performs auxiliary control of the main CPU 101 in the data processing system. A main-CPU-boot-data storage unit or circuit 107 stores a program for performing boot-up of the main CPU 101. In the present embodiment, it is assumed that a memory device is used. A sub-CPU-boot-data storage unit 108 stores a program for performing boot-up of the sub CPU 102. In the present embodiment, it is assumed that a memory device is used.

In the present embodiment, the sub CPU 102 is booted up prior to the main CPU 101 at the time of power-on, and performs an operation according to a program stored in the sub-CPU-boot-data storage unit 108. In such an operation, a verification operation of validity is performed to verify whether or not boot data stored in the main-CPU-boot-data storage unit 107 has changed due to tampering or aging. In the following, when there is no problem with the boot-up data of the main CPU 101 according to the verification operation of validity, boot up of the main CPU 101 is performed by using a program in the main-CPU-boot-data storage unit 107.

In the present system, as a memory connected to the ASIC 100, a memory 109 is connected to the ASIC 100, besides the main-CPU-boot-data storage unit 107 and the sub-CPU-boot-data storage unit 108. It is assumed with respect to the memory 109 that a memory device of the memory 109 is not used at the time of the verification processing.

An 10 control unit 103 is a portion including an I/F module as a downstream module that transfers data between a memory and various types of I/F connected to the ASIC 100. An I/F module 104 in the IO control unit 103 is a memory I/F-1 that is an I/F for data transfer to and from the main-CPU-boot-data storage unit 107. An I/F module 105 in the IO control unit 103 is a memory I/F-2 that is an I/F for data transfer to and from the sub-CPU-boot-data storage unit 108. An I/F module 106 in the 10 control unit 103 is a memory I/F-3 that is an I/F for data transfer to and from the memory 109.

A data processing unit-1 or circuit-1 110 is a first data processing circuit for performing predetermined processing with respect to data to be handled in the present system. It is assumed with respect to the data processing unit 110 that a circuit of the data processing unit 110 is not used at the time of the verification processing. A data processing unit-2 or circuit-2 111 is a second data processing circuit for performing predetermined processing with respect to data to be handled. An internal circuit of the data processing unit 111 is divided into a module 112 and a module 113 as a sub-module unit. With respect to the module 112, a circuit of the module 112 is used at the time of the verification processing to output a control signal to an LED connected to the ASIC 100. It is assumed with respect to the module 113 that a circuit of the module 113 is not used at the time of the verification processing.

An LED 123 is controlled to be turned on or turned off by an LED control signal from the module 112. In the present embodiment, when it is determined as a result of the verification processing of validity that boot data for the main CPU 101 has not changed, the LED 123 is maintained in a turned-off state that is a default state. On the other hand, when it is determined that the boot data has changed, the LED 123 is changed from a turned-off state to a turned-on state to notify a user of the determination result.

An oscillator 115 supplies a clock (CLK-OSC) for performing an operation of the ASIC 100. It is assumed in the present embodiment that a 10 MHz clock is supplied. A clock generator 116 generates clocks to be supplied to respective circuits for performing the internal operation of the ASIC 100. The clock generator 116 includes at least a PLL (phase-locked loop), a frequency division circuit, and a clock gate circuit. The PLL generates a high-speed clock from a clock input from the oscillator 115. The frequency division circuit generate a clock of a frequency required for each circuit, based on the high-speed clock generated by the PLL. The clock gate circuit (hereinafter abbreviated as CG) is a circuit that performs control of supplying and stopping a clock with respect to each circuit. With respect to clocks output from the clock generator 116, CLK-A is supplied to the data processing unit 110 and CLK-B is supplied to the module 112 in the data processing unit 111. In addition, CLK-C is supplied to the module 113 in the data processing unit 111 and CLK-D is supplied to the memory I/F 104 in the IO control unit 103. CLK-E is supplied to the memory I/F 105 in the IO control unit 103, CLK-F is supplied to the memory I/F 106 in the IO control unit 103, CLK-G is supplied to the main CPU 101, CLK-H is supplied to the sub CPU 102, and CLK-I is supplied to a clock control unit 114 described below.

An internal configuration of the clock generator 116 will be described below. A PLL 117 generates a high-speed clock (CLK-PLL) for performing the internal operation of the ASIC 100 from the clock (CLK-OSC) input from the oscillator 115. In a normal operation of the present embodiment, it is assumed to generate and output a clock of 1200 MHz that is 120 times a 10 MHz clock that is an input clock. A frequency division unit 118 receives as input the high-speed clock (CLK-PLL) output from the PLL 117, and generates, by frequency division circuits A to I, clocks of frequencies adjusted to operation frequencies of respective circuits in the ASIC 100. In the present embodiment, it is assumed with respect to the frequencies of the clocks generated by the frequency division unit 118 when the ASIC 100 performs a normal operation that CLK-A has 100 MHz according to one-twelfth frequency division and CLK-B has 100 MHz according to one-twelfth frequency division. In addition, it is assumed that CLK-C has 50 MHz according to one-twenty-fourth frequency division, CLK-D has 50 MHz according to one-twenty-fourth frequency division, CLK-E has 50 MHz according to one-twenty-fourth frequency division, and CLK-F has 50 MHz according to one-twenty-fourth frequency division. Further, it is assumed that CLK-G has 150 MHz according to one-eighth frequency division, CLK-H has 100 MHz according to one-twelfth frequency division, and CLK-I has 100 MHz according to one-twelfth frequency division.

A clock output control unit or circuit 119 receives input of clocks subjected to frequency division into operation frequencies of respective processing circuits output from the frequency division unit 118. In addition, the clock output control unit 119 performs, by the CG circuits A to I, control of supplying and stopping clocks, in accordance with an internal operation state such as an operation mode in the ASIC 100. In the present embodiment, the CG circuits of the clock output control unit 119 are in a state of supplying all of the clocks when the ASIC 100 performs a normal operation.

The clock control unit or circuit 114 internally has a register, and outputs values set in the register, by access from the main CPU 101 or the sub CPU 102 as control signals for various circuits in the clock generator 116. It is assumed with respect to the PLL 117 in the clock generator 116 that a PLL control signal is output. Although not described in detail by referring to figures, it is assumed with respect to the PLL control signal that the PLL control signal including a plurality of bits is output to perform setting of the multiplication number. In addition, it is assumed with respect to each frequency division circuit in the frequency division unit 118 that a frequency division circuit control signal is output to set a division ratio for generating each clock. It is assumed with respect to the frequency division circuit control signal that a signal including a plurality of bits is output for each frequency division circuit. In addition, it is assumed with respect to each CG circuit in the clock output control unit 119 that a clock output control signal for performing control of supplying and stopping each clock is output. It is assumed with respect to the clock output control signal that a one-bit signal is output for each CG circuit.

A DATA bus 120 is a data bus responsible for data transfer among various CPUs, the data processing units, and various control units described above. A reset control unit or circuit 121 supplies reset signals of various CPUs, the data processing units, and various control units in the ASIC 100, although detailed connection is omitted in FIG. 1. The reset control unit 121 performs reset-release of the sub CPU 102, based on hardware sequence arranged by the internal circuit after power-on. Further, the reset control unit 121 performs reset control of various CPUs, the data processing units, and various control units in the ASIC 100 by controlling the sub CPU 102 and the main CPU 101. The reset control unit 121 needs to perform various types of reset control before other various CPUs or other circuits become active at the time of power-on, and thus is configured to operate by the clock (CLK-OSC) output from the oscillator.

Although not illustrated in detail in FIG. 1, the power supply control unit or circuit 122 receives input of power to be used by the circuits in the ASIC 100 from a power supply terminal of the ASIC 100. Further, the power supply control unit 122, under control by the main CPU 101 or the sub CPU 102, performs control of supplying and shutting down power with respect to respective circuits in the ASIC 100. However, as with units in general, the power supply control unit 122 has a limited number of blocks to be subjected to the control of supplying and shutting down power, and is not a circuit that can perform fine-tuned power supply control with respect to a large number of processing modules. It is assumed that the power supply control unit 122 according to the present embodiment can perform power supply control of five blocks of the data processing unit 110, the data processing unit 111, the IO control unit 103, the main CPU 101, and the sub CPU 102. In addition, it is assumed with respect to an operation clock of the power supply control unit 122 that CLK-OSC input from the oscillator 115 is used.

Power Supply Control Unit

Next, an internal configuration of the power supply control unit 122 according to the present embodiment will be described by referring to FIG. 2. It is assumed to supply power of 1.0 V from a power supply circuit 201 to the ASIC 100 as power for operating internal circuits. The supplied power is input to the power supply control unit 122.

The internal configuration of the power supply control unit 122 includes a power supply control register unit 202, and a plurality of power supply switches (hereinafter abbreviated as SWs). The power supply SWs are prepared by the same number as the number of blocks to be subjected to the control of supplying and shutting down power, and in the present embodiment it is assumed that five power supply SWs are prepared. Power supply control of the data processing unit 110 is performed by a power supply SW-1 (203), power supply control of the data processing unit 111 is performed by a power supply SW-2 (204), and power supply control of the IO control unit 103 is performed by a power supply SW-3 (205). Power supply control of the main CPU 101 is performed by a power supply SW-4 (206), and power supply control of the sub CPU 102 is performed by a power supply SW-5 (207). Namely, with respect to the module 112 and the module 113, power supply control is performed by the single power supply SW-2 (204) as the data processing unit 111. Similarly, with respect to the memory I/F 104, the memory I/F 105, and the memory I/F 106, control of power supply is performed by the single power supply SW-3 (205).

Figure 2:
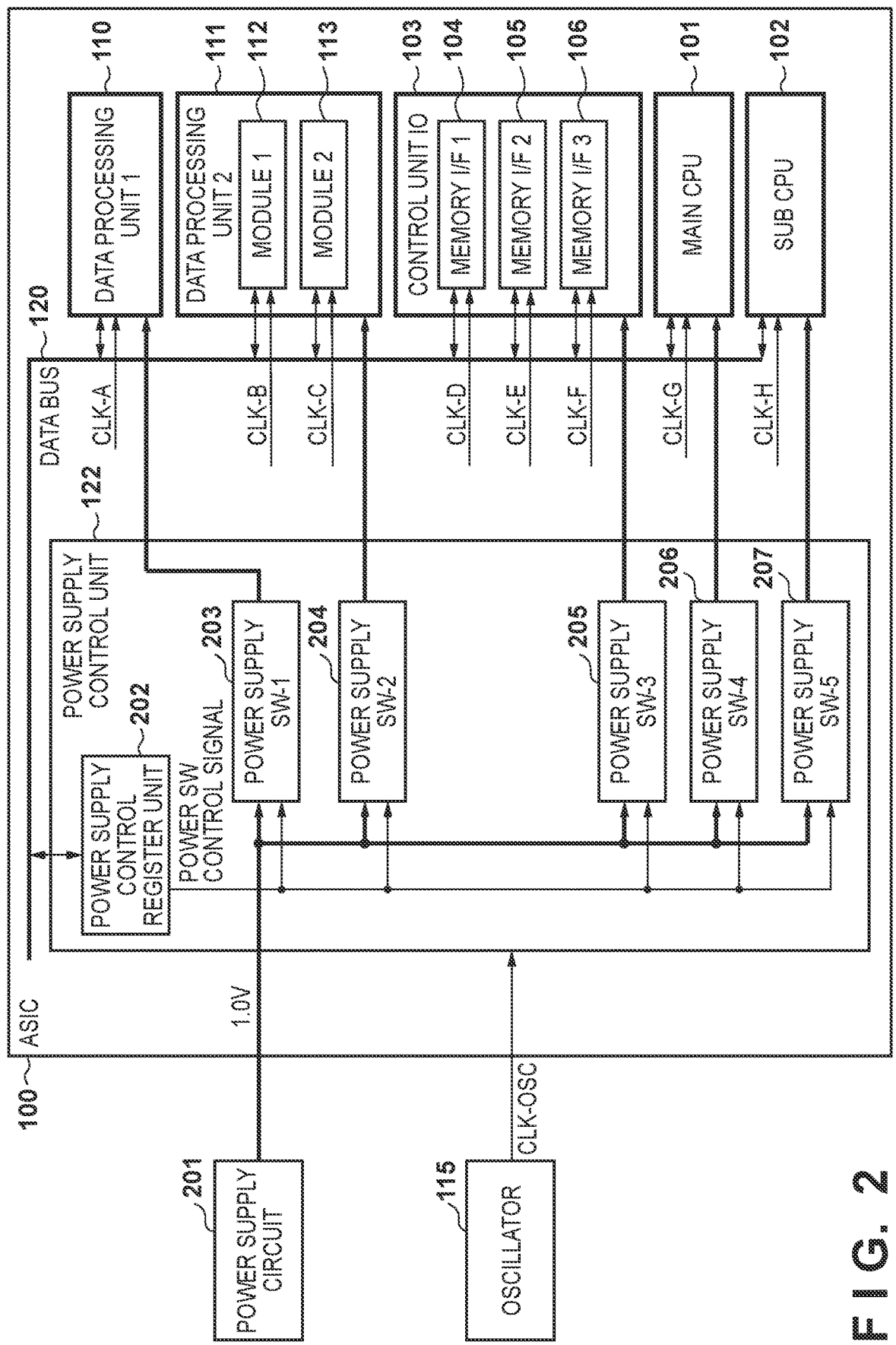
FIG. 2 is a block diagram illustrating an internal configuration of a power supply control unit or circuit 122 and a detailed configuration of power supply control according to an embodiment.

Although not illustrated in detail in FIG. 2, a power supply SW control signal formed of one bit that turns ON and OFF the power supply is connected to each of the power supply SWs from the power supply control register unit 202. The power supply control register unit 202 is connected to the DATA bus (120) and internally has a register for controlling output of each power supply SW control signal. It is assumed that the register switches values by access from the main CPU 101 or the sub CPU 102 to perform control of power supply and power shutdown.

Basic Operation Flow

Figure 3:
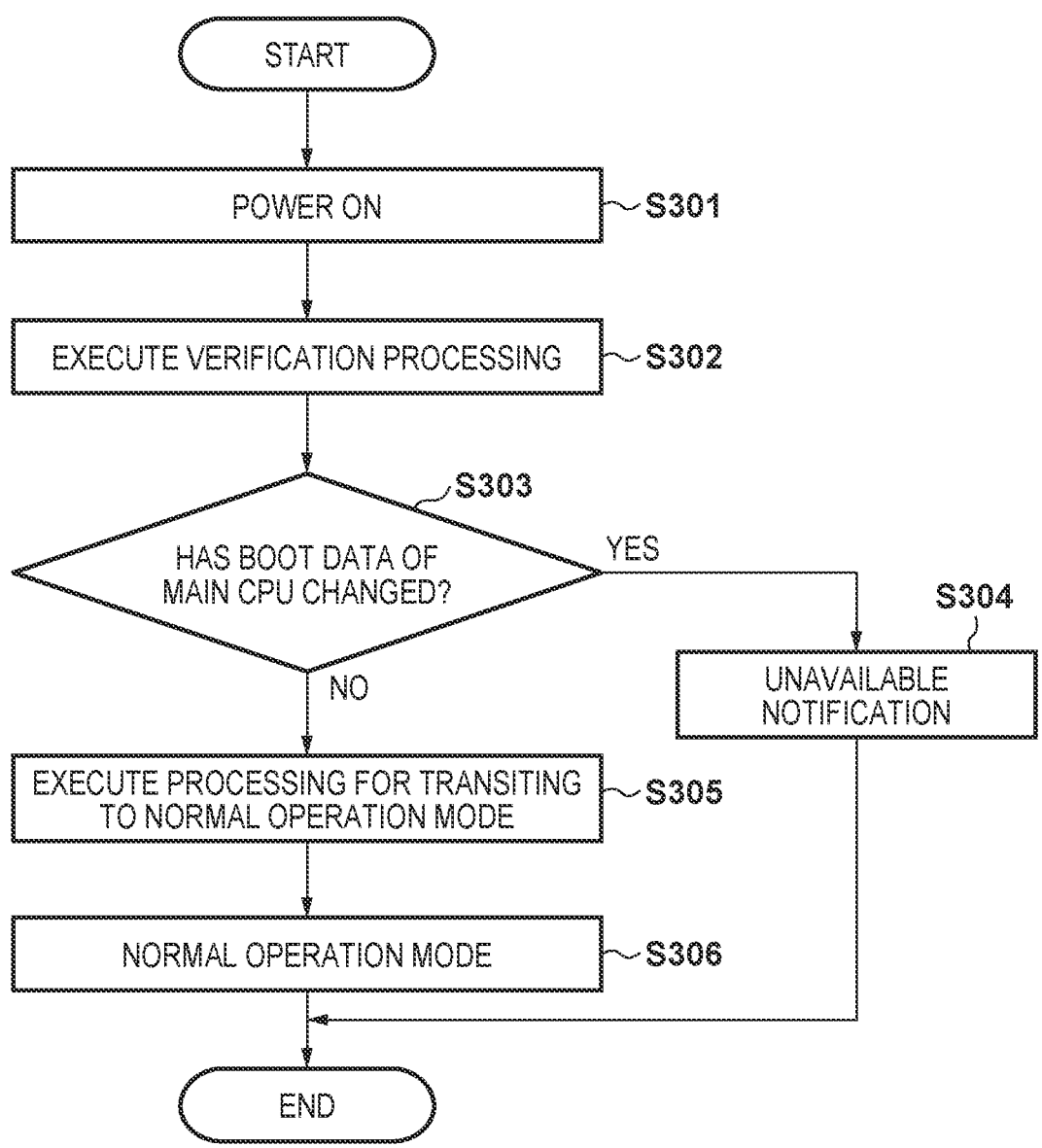
FIG. 3 illustrates a basic operation flow of a data processing system according to an embodiment.

Next, a basic operation flow of the system in the present embodiment will be described by referring to FIG. 3.

At S301, activation of the ASIC 100 of the system starts with power-on. At the time of activation of the ASIC 100, a verification operation mode of validity of boot data (including a program code or the like) is made. At S302, verification processing of validity is executed to determine whether or not the boot data of the main CPU 101 stored in the main-CPU-boot-data storage unit 107 has changed.

At S303, the sub CPU 102 determines whether or not the boot data of the main CPU 101 has changed, based on the result of the verification processing of validity. When it is determined (Yes at S303) that the boot data has changed (verification processing has failed), notification is performed by turning on the LED 123 to indicate that the system is unavailable, and an operation of the system stops. Note that although details of the verification processing are omitted, it is assumed to perform confirmation by using an electronic signature technique applying public key cryptography, and verification is performed by comparison with reliable signature data. The same applies to processing in FIG. 5 described below.

On the other hand, when it is determined (No at S303) as a result of the verification processing that the boot data of the main CPU 101 has not changed (verification processing has succeeded), the process flow proceeds to S305. At S305, the sub CPU 102 executes processing for transiting from the verification operation mode of validity controlled by the sub CPU 102 to a normal operation mode controlled by the main CPU 101. Subsequently, at S306, the transition to the normal operation mode controlled by the main CPU 101 is performed, and the flowchart ends.

Internal Operation at Time of Verification Processing

Figure 4:
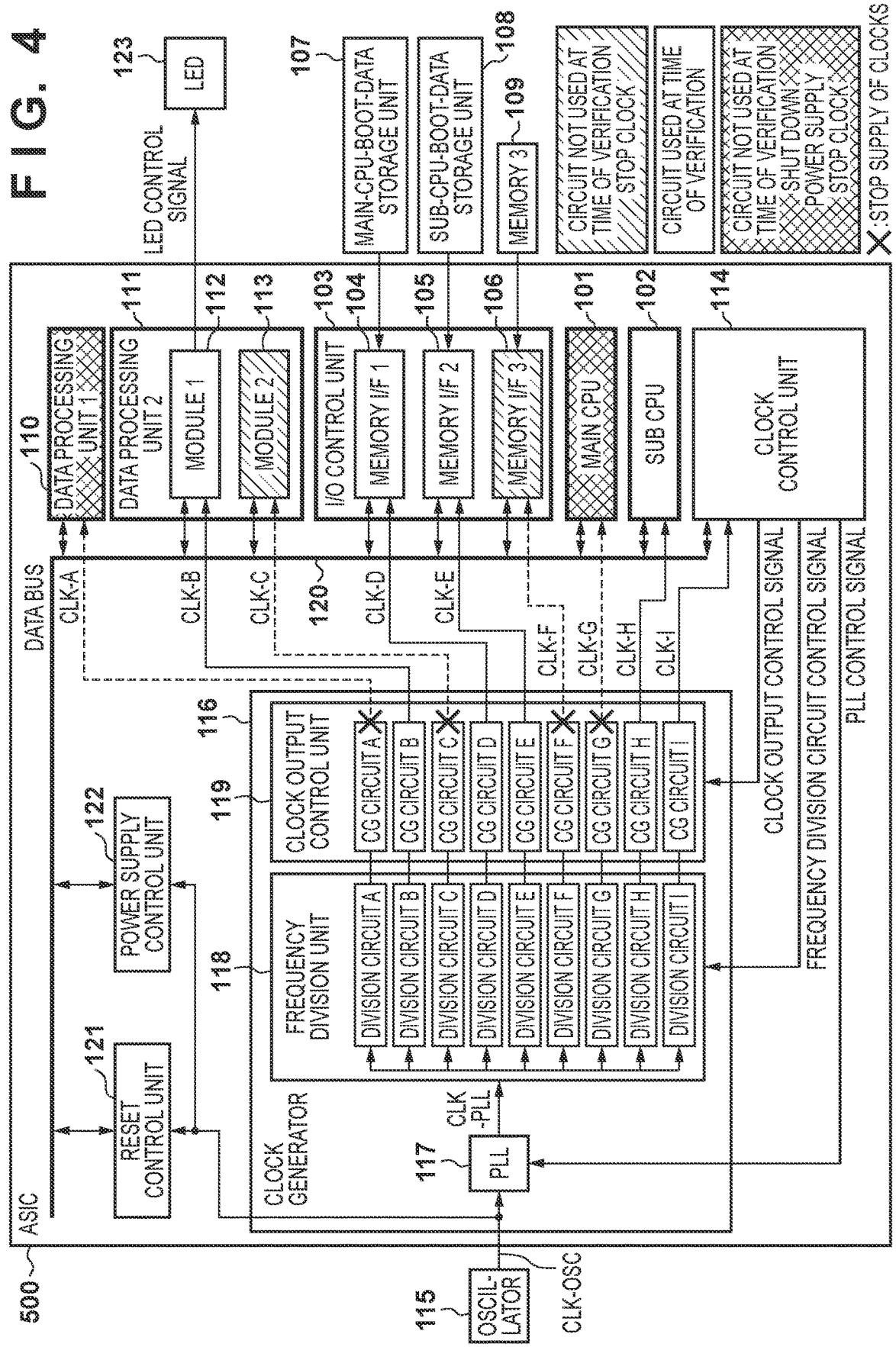
FIG. 4 is a block diagram illustrating an internal operation at the time of verification processing according to an embodiment.

Next, an internal operation state at the time of the verification processing of validity of the system will be described in detail by referring to FIG. 4. Circuits not used at the time of the verification processing are the data processing unit 110, the module 113 in the data processing unit 111, the memory I/F 106 in the IO control unit 103, and the main CPU 101. It is required for the module 112 in the data processing unit 111 to be operated at the time of the verification processing to generate an LED control signal for notifying a user of the result of the verification processing by the LED 123 connected to the ASIC 100. It is required for the memory I/F 104 to be operated at the time of the verification processing to input the boot data for the main CPU from the main-CPU-boot-data storage unit 107 connected to the ASIC 100 when the verification processing is performed. It is required for the memory I/F 105 to be operated at the time of the verification processing to input the boot data for the sub CPU from the sub-CPU-boot-data storage unit 108 connected to the ASIC 100 when the verification processing is performed. The sub CPU 102 is assumed to control respective processing units of the present ASIC 100 when the verification processing is performed, and thus it is required for the sub CPU 102 to be operated at the time of the verification processing.

The clock control unit or circuit 114, the clock generator 116, the reset control unit or circuit 121, and the power supply control unit or circuit 122 are assumed to supply and control power, clocks and reset signals from the time of activation to the time of the verification processing, and thus are not subjected to stopping supply of power and clocks. At the time of the verification processing here, power saving control with a finer granularity is performed by taking power saving countermeasures of both shutting down of power and stopping supply of clocks with respect to the circuits not used in the verification processing. Note that without intending to limit the present invention, it is desirable to perform control to take at least one of the power saving countermeasures of shutting down of power and stopping supply of clocks, in accordance with a system configuration (circuit configuration in particular).

Power Shutdown

First, power shutdown with respect to an unused circuit will be described. As described above, there is generally a limit in the number of blocks to be subjected to control of supplying and shutting down of power in the power supply control unit 122. In the power supply control unit 122 according to the present embodiment, five blocks of the data processing unit 110, the data processing unit 111, the IO control unit 103, the main CPU 101, and the sub CPU 102 can be subjected to power supply control.

In the present embodiment, the circuits not used in the verification processing are the data processing unit or circuit 110, the module 113 in the data processing unit or circuit 111, the memory I/F 106 in the IO control unit 103, and the main CPU 101. Of these, blocks that can be subjected to power shutdown are only two blocks of the data processing unit or circuit 110 and the main CPU 101. Although the module 113 of the data processing unit 111 is a circuit not used in the verification processing, the module 112 is assumed to be used and thus cannot be subjected to power shutdown. In addition, with respect to the IO control unit 103, although the memory I/F 106 is a circuit not used in the verification processing, the memory I/F 104 and the memory I/F 105 are assumed to be used and thus cannot be subjected to power shutdown.

Stopping Supply of Clocks

Next, stopping supply of clocks will be described. The countermeasure of stopping supply of clocks is taken with respect to all of the data processing unit 110, the module 113 in the data processing unit 111, the memory I/F 106 in the IO control unit 103, and the main CPU 101 that are not used in the verification processing. The data processing unit 110 and the main CPU 101 are subjected to power shutdown and thus power consumption in each of the circuits is zero. However, output of clocks from the clock generator 116 is stopped, and thus it is assumed that driving of a logic circuit such as a buffer in the middle is not performed with respect to a clock line from the clock generator 116 to the data processing unit 110 and the main CPU 101. Thus, when clocks are stopped, power consumption can be reduced even a little.

As described above, power supply is stopped with respect to the blocks of the circuits not used in the verification processing, and clocks are also stopped with respect to the circuits not used in the verification processing in the blocks that cannot be subjected to power stop. Accordingly, it becomes possible to reduce power consumption of the ASIC 100 to be lower than power consumption in a normal operation.

Effects by Present Embodiment

Specific examples of effects by the present embodiment will be described by referring to FIGS. 6 to 10. The information processing apparatus (data processing system) according to the present embodiment detects generation of a boot code at the time of activating the apparatus. On this occasion, the information processing apparatus executes at least one of power shutdown control and clock gate control as power saving control with respect to a block not required for processing in the verification processing of validity. Further, the information processing apparatus uses excess power provided by the power saving control to increase a frequency of an operation clock to a processing block required for the verification processing of validity, and thus performs the verification processing at a high speed. Results of the verification as to a frequency and power consumption when the above-described control is applied step by step will be described below.

First, a calculation value of the total power consumption in a normal operation of the ASIC 100 will be described by referring to FIG. 6. In FIG. 6, power consumption of each module is calculated by arithmetic computation based on a frequency and a circuit size, with each processing module, a type of a clock used by the module, a frequency of the clock, and a circuit size of each processing module being presented. Further, the total power consumption of those modules is calculated as the power consumption of the ASIC 100 as a whole. Here, the power consumption is calculated assuming that a 1-K gate circuit consumes power of 1 mW in an operation at a frequency of 10 MHz. In addition, it is assumed in the present embodiment that allowable power of a package of the ASIC 100 is set to 8100 mW. In FIG. 6, the total power consumption of the ASIC 100 as a whole in a normal operation is 8053 mW, and the power consumption in a normal operation falls below the allowable power.

Next, the power consumption of the ASIC 100 in a case where only power shutdown is performed at the time of the verification processing in the present embodiment will be described by referring to FIG. 7. In FIG. 7, power consumption of each module is presented in separate columns for power consumption of a circuit used in the verification processing and power consumption of a circuit not used in the verification processing. In this case, power consumption is zero with respect to the data processing unit 110 and the main CPU 101 that are subjected to power shutdown.

In addition, with respect to the module 113 in the data processing unit 111 and the memory I/F 106 in the IO control unit 103 that are in a state where the module 113 and the memory I/F 106 do not perform data processing but are supplied with power and clocks, the power consumption is lower than the power consumption in a normal operation. In the present embodiment, in the above-described case, the power consumption is half the power consumption in a state where normal data processing is performed. Thus, the power consumption of the module 113 in the data processing unit 111 is 1250 mW, and the power consumption of the memory I/F 106 in the IO control unit 103 is 125 mW. Accordingly, the power consumption of the ASIC 100 as a whole reduces to 2977 mW.

As described above, power shutdown is performed with respect to circuits not used at the time of validity detection, and thus excess power can be reduced. Accordingly, it becomes possible to increase a frequency of an operation clock of a circuit required for the verification processing within the range where the allowable power consumption of the ASIC 100 is not exceeded.

FIG. 8 illustrates power consumption in a case where in an operation of the ASIC 100 at the time of the verification processing, power shutdown is performed with respect to a circuit not used at the time of validity detection to reduce excess power, and a circuit required for the verification processing is operated with a frequency of an operation clock increased by a degree obtained by the reduction of excess power.

As described above, it is assumed in the present embodiment that the allowable power of the package of the ASIC 100 is 8100 mW. Thus, a circuit used at the time of validity detection may be operated with a frequency increased within the range where the allowable power 8100 mW of the package is not exceeded. Here, frequencies of CLK-B used in the module 112, CLK-D used in the memory I/F 104 in the IO control unit 103, CLK-E used in the memory I/F 105 in the IO control unit 103, and CLK-H used in the sub CPU 102 are increased four times to operate. Namely, it is assumed that a frequency of CLK-B is increased from 100 MHz to 400 MHz, a frequency of CLK-D is increased from 50 MHz to 200 MHz, a frequency of CLK-E is increased from 50 MHz to 200 MHz, and a frequency of CLK-H is increased from 100 MHz to 400 MHz to operate. In this case, it is assumed that CLK-I used in the clock control unit 114 is controlled by the clock generator 116 based on register setting, and thus high-speed operation is not required, and CLK-I is used with the frequency in a normal operation.

The frequencies of the respective clocks are increased as described above, and thus power consumption of the module 112 in the data processing unit 111 increases to 2000 mW, power consumption of the memory I/F 104 in the IO control unit 103 increases to 100 mW. Further, power consumption of the memory I/F 105 in the IO control unit 103 increases to 100 mW and power consumption of the sub CPU 102 increases to 4000 mW. However, the total power consumption of the ASIC 100 as a whole is 7627 mW, and falls below the allowable power 8100 mW of the package, and it becomes possible to use without any problem.

On the other hand, although detailed description using a table or the like is omitted, with respect to a case where a circuit used in the validity detection is operated with an operation frequency increased 5 times, power consumption calculated in the same manner as described above is 9177 mW, and exceeds the allowable power of the package. Thus, it can be seen that when the countermeasure of power shutdown is taken alone, a circuit used in the validity detection cannot be used with a frequency of an operation clock increased 5 times.

Next, power consumption of the ASIC 100 when both shutdown control of power supply and CG control are performed at the time of the verification processing will be described by referring to FIG. 9. Similarly, in FIG. 9, power consumption of each module is presented in separate columns for power consumption of a circuit used in the verification processing and power consumption of a circuit not used in the verification processing.

In this case, power consumption of the data processing unit 110 and the main CPU 101 subjected to power shutdown is zero. In addition, with respect to the module 113 in the data processing unit 111 and the memory I/F 106 in the IO control unit 103 that are in a state where the module 113 and the memory I/F 106 do not perform data processing but are supplied with power and subjected to stopping supply of clocks, the power consumption is lower than the power consumption when clocks are supplied. Here, it is assumed that the power consumption in this case is one-twentieth of the state in which normal data processing is performed. Thus, power consumption of the module 113 in the data processing unit 111 is 125 mW, and power consumption of the memory I/F 106 in the IO control unit 103 is 12.5 mW. Accordingly, the power consumption of the ASIC 100 as a whole reduces to 1739.5 mW.

As described above, power supply is stopped with respect to a block in which power shutdown can be performed with respect to a circuit not used at the time of validity detection. In addition, even when a block cannot be subjected to stopping of power supply, but includes an unused circuit, stopping of clocks by CG control is performed, and thus excess power can further be reduced in comparison with when the countermeasure of power shutdown is taken alone.

Accordingly, it becomes possible to further increase, in comparison with the case of power shutdown alone, a frequency of an operation clock of a circuit required for the verification processing within the rage where the allowable power consumption of the ASIC 100 is not exceeded.

Power consumption in a case where power shutdown and stopping of supply of clocks are performed with respect to a circuit not used at the time of the verification processing to reduce excess power, and a circuit required for the verification processing is operated with a frequency of an operation clock increased will be described by referring to FIG. 10. As described above, it is assumed in the present embodiment that the allowable power of the package of the ASIC 100 is 8100 mW. Thus, a circuit used in the validity detection may be operated with a frequency increased within the range where the allowable power 8100 mW of the package is not exceeded.

Therefore, in the present embodiment, a frequency of CLK-B used in the module 112 in the data processing unit 111 and a frequency of CLK-D used in the memory I/F 104 in the IO control unit 103 are increased five times to operate. Further, a frequency of CLK-E used in the memory I/F 105 in the IO control unit 103 and a frequency of CLK-H used in the sub CPU 102 are increased five times to operate. Namely, the frequency of CLK-B is increased from 100 MHz to 500 MHz, the frequency of CLK-D is increased from 50 MHz to 250 MHz, the frequency of CLK-E is increased from 50 MHz to 250 MHz, and the frequency of CLK-H is increased from 100 MHz to 500 MHz to operate. In this case, it is assumed that CLK-I used in the clock control unit 114 is controlled by the clock generator 116 based on register setting, and thus high-speed operation is not required, and CLK-I is used with the frequency in a normal operation.

The frequencies of the respective clocks are increased as described above, and thus power consumption of the module 112 in the data processing unit 111 increases to 2500 mW, and power consumption of the memory I/F 104 in the IO control unit 103 increases to 125 mW. In addition, power consumption of the memory I/F 105 in the IO control unit 103 increases to 125 mW, and power consumption of the sub CPU 102 increases to 5000 mW.

However, the total power consumption of the ASIC 100 as a whole is 7939.5 mW, and falls below the allowable power 8100 mW of the package, and it becomes possible to use without any problem. Namely, it becomes possible to perform the verification processing with a clock of a higher frequency than in a case where a power saving countermeasure is taken by performing power shutdown alone.

Detailed Operation Flow

Next, a detailed operation flow at the time of activating the system, including power shutdown control and clock gate control according to the present embodiment will be described by referring to FIG. 5. In addition, in the processing of the present flowchart, it is assumed that with respect to power reduction by power shutdown control and by the clock gate, reduction of time required for the verification processing is performed by increasing a frequency of an operation clock of a circuit used in the verification processing. It is needless to say that in the present invention, only power saving control is applied and the above-described control of increasing the frequency to reduce the processing time may not be applied.

At S501, activation of the ASIC 100 of the system starts with power-on. Subsequently, at S502, an operation of the reset control unit 121 starts with an operation of a clock from the oscillator 115, and reset of the clock control unit 114 and the clock generator 116 is released by hardware sequence in the reset control unit 121. On this occasion, a PLL control signal and a frequency division circuit control signal from the clock control unit 114 are set to generate a clock in a normal operation, according to an initial setting value after the reset-release.

Next, at S503, the clock output control unit 119 performs, with respect to the clock output control signal, setting of supplying all clocks to respective circuits as with in a normal operation, according to the initial setting value after the reset-release. Subsequently, at S504, reset of the sub CPU 102, the memory I/F 104, the memory I/F 105, and the module 112 which are used in the verification processing is released by the hardware sequence in the reset control unit 121. When the reset of the respective circuits is released, the sub CPU 102 reads, at S505, boot data from the sub-CPU-boot-data storage unit 108 via the memory I/F 105 to complete booting.

Subsequently, at S506, the sub CPU 102 shuts down power supply to a circuit not used in the verification processing. In the present embodiment, the sub CPU 102 shuts down power supply to the data processing unit 110 and the main CPU 101. Specifically, power supply to the data processing unit 110 and the main CPU 101 is shut down by rewriting the register for power supply control in the power supply control unit 122 from the sub CPU 102.

Subsequently, at S507, the sub CPU 102 stops supply of a clock (clock gating) to a circuit not used in the verification processing. The sub CPU 102 stops supply of clocks of CLK-A used in the data processing unit 110, CLK-C used in the module 113 of the data processing unit 111, CLK-F used in the memory I/F 106 in the IO control unit 103, and CLK-G used in the main CPU 101. Specifically, the sub CPU 102 stops supplying each clock by rewriting the register for a clock output control signal of the clock control unit 114 and switching the operations of the CG circuit in the clock generator 116.

When the clock stop control is completed, the sub CPU 102 performs, at S508, control of increasing a frequency of a clock to a circuit required for the verification processing.

In the present embodiment, frequencies of CLK-B used in the module 112 in the data processing unit 111, and CLK-D used in the memory I/F 104 in the IO control unit 103 are increased five times frequencies in a normal operation to operate. Further, frequencies of CLK-E used in the memory I/F 105 in the IO control unit 103 and CLK-H used in the sub CPU 102 are increased five times frequencies in a normal operation to operate.

To realize supply of a clock with a five-fold frequency, it is necessary to increase a frequency of a clock output from the PLL 117 (CLK-PLL) to be higher than the default setting of 1200 MHz. Thus, with respect to clocks other than the clocks used in the verification processing, it is also necessary to change a division ratio to maintain the frequencies of the clocks generated according to the initial setting value. However, with respect to CLK-A used in the data processing unit 110, CLK-F used in the memory I/F 106 in the IO control unit 103, and CLK-G used in the main CPU 101, it is not necessary to change a division ratio. This is because output of the clocks has already been stopped by the clock output control unit 119 in the clock generator 116. Thus, in the present embodiment, a division ratio is changed only with respect to the clock control unit 114 to maintain the frequencies of the clocks generated according to the initial setting value. In detail, the sub CPU 102 rewrites the register for the PLL control signal and the register for the frequency division circuit control signal of the clock control unit 114, and changes the frequency of the clock from PLL 117 (CLK-PLL) and the division ratio of each clock from the division ratio in a normal operation.

First, with respect to the PLL 117 setting, it is assumed that CLK-PLL resulting from multiplying the input CLK-OSC by 120 is output with a frequency of 1200 MHz, as the initial value after the reset-release. However, when the verification processing according to the present embodiment is performed, CLK-PLL resulting from multiplying the input CLK-OSC by 300 is output with a frequency of 3000 MHz. In addition, the frequency of CLK-B used in the module 112 in the data processing unit 111 used in the verification processing is increased from 100 MHz to 500 MHz by changing the division ratio from one-twelfth of 1200 MHz to one-sixth of 3000 MHz. In addition, the frequency of CLK-D used in the memory I/F 104 in the IO control unit 103 is increased from 50 MHz to 250 MHz by changing the division ratio from one-twenty-fourth of 1200 MHz to one-twelfth of 3000 MHz. The frequency of CLK-E used in the memory I/F 105 in the IO control unit 103 is also increased from 50 MHz to 250 MHz by changing the division ratio from one-twenty-fourth of 1200 MHz to one-sixth of 3000 MHz. The frequency of CLK-H used in the sub CPU 102 is increased from 100 MHz to 500 MHz by changing the division ratio from one-twelfth of 1200 MHz to one-sixth of 3000 MH. In this manner, the respective frequencies are increased by changing the respective division ratios. In addition, with respect to the clock control unit 114, the division ratio is changed from one-twelfth of 1200 MHz to one-thirtieth of 3000 MHz to maintain the same 100 MHz frequency as the frequency in a normal processing.

After the control with respect to the frequency division of the clocks to be used is completed, the sub CPU 102 executes the verification processing at S509. Although detailed description of the verification processing is omitted, boot data for the main CPU stored in the main-CPU-boot-data storage unit 107 is acquired via the memory I/F 104 by control from the sub CPU 102 to determine whether or not the data has changed. When it is determined (Yes at S510) as the result of the verification processing that the boot data of the main CPU 101 has changed (verification processing has failed), the sub CPU 102 notifies by turning on the LED 123 at S511 that the system is unavailable. Subsequently, the operation of the system is stopped and the flowchart ends. Specifically, the sub CPU 102 switches an LED control signal output from the module 112 in the data processing unit 111 from a turned-off state to a turned-on state. Note that although a turn-on control of the LED 123 is described here as an example, the notification control in stopping activation may be performed in a variety of forms. For example, the notification control may be performed by audio output, information notification to a predetermined apparatus (email, fax, etc.), recording in a predetermined storage area as history information, print output, display output, or the like.

On the other hand, when it is determined (No at S510) as the result of the verification processing that the boot data of the main CPU 101 has not changed (verification processing has succeeded), the process flow proceeds to S512. Here, processing for transiting from a verification operation mode of validity by the sub CPU 102, to a normal operation mode controlled by the main CPU 101 is performed. At S512, as the process for transiting to the normal operation mode, the sub CPU 102 first returns the frequencies of CLK-B used in the module 112 in the data processing unit 111 and CLK-D used in the memory I/F 104 in the IO control unit 103 back to the frequencies in a normal operation. Further, the sub CPU 102 returns the frequencies of CLK-E used in the memory I/F 105 in the IO control unit 103 and CLK-H used in the sub CPU 102 back to the frequencies in a normal operation. Specifically, a portion where the setting has been changed by the clock frequency switching is returned back to the original prior to the verification processing. Namely, the sub CPU 102 rewrites the register for the PLL control signal of the clock control unit 114, and returns the multiplier of the PLL 117 to the value in a normal operation. Further, the sub CPU 102 rewrites the register for the frequency division circuit control signal of the clock control unit 114 from the sub CPU 102, and returns the division ratio for each clock from the division ratio at the time of the verification processing back to the division ratio in a normal operation.

Subsequently, at S513, the sub CPU 102 returns supply of a clock to a circuit not used in the verification processing. According to the present embodiment, returning of supply of a clock that is stopped at the time of the verification processing is performed with respect to CLK-A used in the data processing unit 110 and CLK-C used in the module 113 in the data processing unit 111. Further, returning of supply of a clock is performed with respect to CLK-F used in the memory I/F 106 in the IO control unit 103 and CLK-G used in the main CPU 101. Specifically, the sub CPU 102 also rewrites the register for the clock output control signal of the clock control unit 114, and returns supply of each clock by switching the operations of the CG circuit of the clock generator 116.

Subsequently, at S514, the sub CPU 102 returns power supply to a circuit not used in the verification processing. In the present embodiment, power supply to the data processing unit 110 and the main CPU 101 is returned. Specifically, the sub CPU 102 rewrites the register for power supply control in the power supply control unit 122, and returns power supply to the data processing unit 110 and the main CPU 101.

When the above-described processing is completed, the sub CPU 102 releases, at S515, reset of the main CPU 101, the data processing unit 110, the module 113 in the data processing unit 111, the memory I/F 106 in the JO control unit 103, or the like from the reset control unit 121. The reset-release triggers the main CPU 101 to read, at S516, data for main CPU boot from the main-CPU-boot-data storage unit 107 via the memory I/F 104 and to be activated, and the flowchart ends. According to the above-described flow, the processing at the time of system activation is completed and proceeds to a normal operation.

As described above, the information processing apparatus includes a storage unit that stores boot data, a power supply control unit that supplies power to a plurality of blocks each having one or more circuits, and a clock control unit that controls supply of a clock from an oscillator to each circuit of each block. In addition, the information processing apparatus includes a sub CPU that executes verification processing of verifying validity of boot data stored in the storage unit, and a main CPU that is activated by using boot data having validity successfully verified by the sub CPU, and that controls the information processing apparatus. The sub CPU causes the power supply control unit to supply power to a block in which at least one circuit is used in the verification processing, and shut down power supply to a block in which all circuits are not used in the verification processing. In addition, the sub CPU causes the clock control unit to supply a clock to a circuit used in the verification processing, stop supply of a clock to a circuit not used in the verification processing, and subsequently execute the verification processing. In this manner, according to the present embodiment, power consumption at the time of validity detection can be reduced by shutting down power supplied to and stopping supply of a clock to a circuit not used at the time of the verification processing of validity. In addition, as a result, it becomes possible to complete the verification processing at a high speed while keeping the upper limit of the allowable power consumption of a chip.

Note that, in a case where it is not necessary to complete the verification processing at a high speed, it is not necessary to increase the operation clock at the time of validity detection, and it also becomes possible to perform processing with reduced power consumption. In addition, although control of performing both power shutdown and stopping of supply of clocks as power saving control is described in the above-described embodiments, for example, control of performing only stopping of supply of clocks may be used depending on a system configuration and specification.

According to the present invention, it is possible to reduce power consumption in verification processing by performing, with a fine granularity, clock stop control with respect to a circuit or the like not used in the verification processing.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like. The term "unit" may also be referred to as "circuit" which contains circuitry or elements to perform the specified operation.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-189652 filed on Oct. 16, 2019, which is hereby incorporated by reference herein in its entirety.

What is claimed is:

1. An information processing apparatus comprising:
a first storage circuit that stores a first program;
a second storage circuit that stores a second program;
a notification device that notifies a user of information;
a first control circuit that executes the first program stored in the first storage circuit, and performs a verification of validity of the second program stored in the second storage circuit; and
a second control circuit that executes the second program after it is determined to be valid as a result of the verification by the first control circuit;
a power supply control circuit that controls supply of power to a plurality of blocks, the plurality of blocks including a first block having a first module circuit and a second module circuit, the first module circuit used for the verification by the first control circuit and controlling a notification by the notification device based on the verification by the first control circuit, and the second module circuit not used for the verification by the first control circuit; and
a clock control circuit that controls supply of at least one module circuit clock to a corresponding module circuit of a plurality of module circuits, the plurality of module circuits included in the plurality of blocks, wherein
while the second program is verified by the first control circuit,
the first control circuit causes the power supply control circuit to supply power to the first block, the first block including the first module circuit used for the verification by the first control circuit, and to not supply power to a second block, the second block not being used for the verification by the first control circuit, among the plurality of blocks, and
the first control circuit causes the clock control circuit to supply a first module circuit clock to the first module circuit of the first block and to not supply a second module circuit clock to the second module circuit of the first block.

2. The information processing apparatus according to claim 1, wherein the first control circuit causes the power supply control circuit to control supply of power to each of the plurality of blocks, causes the clock control circuit to control whether or not to supply the at least one module circuit clock to the corresponding module circuit of the plurality of module circuits, the clock control circuit increasing an operating frequency of the last least one module circuit clock from a frequency for a normal operation when the corresponding module circuit is used for the verification, the increase accomplished by changing a division ratio of the at least one module circuit clock, and the first control circuit subsequently performs the verification of validity of the second program.

3. The information processing apparatus according to claim 2, wherein the first control circuit, the second control circuit, the power supply control circuit, and the clock control circuit are provided in the plurality of blocks, and
the first control circuit causes the clock control circuit to increase the operating frequency of the at least one module circuit clock supplied to the corresponding module circuit used for the verification in a range where allowable power of a package including at least the plurality of blocks is not exceeded.

4. The information processing apparatus according to claim 1, wherein when the verification of validity by the first control circuit succeeds, the first control circuit causes the power supply control circuit to supply power to the second block and causes the clock control circuit to supply the second module circuit clock to the second module circuit of the first block.

5. The information processing apparatus according to claim 1, wherein when the verification of validity fails, the first control circuit notifies of the failure via the notification device and stops activation of the information processing apparatus.

6. The information processing apparatus according to claim 5, wherein the notification device is a LED, the first control circuit notifies of the failure by controlling the LED from a turned-off state to a turned-on state.

7. The information processing apparatus according to claim 1, further comprising:
a third storage circuit that stores a third program,
wherein the plurality of blocks includes a third block having a third module circuit reading the first program from the first storage circuit, a fourth module circuit reading the second program from the second storage circuit, and a fifth module circuit reading the third program from the third storage circuit,
the first control circuit causes the power supply control circuit to supply power to the third block, the third block including a module circuit used for verification by the first control circuit, and
the first control circuit causes the clock control circuit to supply a third module circuit clock to the third module circuit and a fourth module circuit clock to the fourth module circuit of the third block, and to not supply a fifth module circuit clock to the fifth module circuit of the third block.

8. The information processing apparatus according to claim 1, wherein
the plurality of blocks includes a fourth block having a sixth module circuit executing a predetermined processing to data to be processed in the information processing apparatus,
the first control circuit causes the power supply control circuit to not supply power to the fourth block, the fourth block not being used for the verification by the first control circuit, and
causes the clock control circuit to not supply a sixth module circuit clock to the sixth module circuit of the fourth block.

9. An information processing apparatus comprising:
a first storage circuit that stores a first program;
a second storage circuit that stores a second program;
a notification device that notifies a user of information;
a first control circuit that executes the first program stored in the first storage circuit, and performs a verification of validity of the second program stored in the second storage circuit;
a second control circuit that executes the second program after it is determined to be valid as a result of the verification by the first control circuit; and
a clock control circuit that controls supply of at least one module circuit clock to a corresponding module circuit of a plurality of module circuits, the plurality of module circuits included in a plurality of blocks, the plurality of blocks including a first block having a first module circuit and a second module circuit, the first module circuit used for the verification by the first control circuit and controlling a notification by the notification device based on the verification by the first control circuit, and the second module circuit not used for the verification by the first control circuit, wherein
while the second program is verified by the first control circuit,
the first control circuit causes the clock control circuit to supply a first module circuit clock to the first module circuit of the first block and to not supply a second module circuit clock to the second module circuit of the first block.

10. The information processing apparatus according to claim 9, wherein the first control circuit causes the clock control circuit to not supply the second module circuit clock to the second module circuit, and then increases an operating frequency of the first module circuit clock from a frequency for a normal operation, the increase accomplished by changing a division ratio of the first module circuit clock, and the first control circuit subsequently performs the verification of validity of the second program.

11. The information processing apparatus according to claim 10, wherein the first control circuit, the second control circuit, and the clock control circuit are provided in the plurality of blocks, and
the first control circuit causes the clock control circuit to increase a frequency of the first module circuit clock in a range where allowable power of a package including at least the plurality of blocks is not exceeded.

12. The information processing apparatus according to claim 10, wherein when the verification of validity by the first control circuit succeeds, the first control circuit causes the clock control circuit to return the division ratio of the first module circuit clock supplied to the first module circuit to a ratio for the normal operation.

13. The information processing apparatus according to claim 9, wherein when the verification of validity fails, the first control circuit notifies of the failure via the notification device and stops activation of the information processing apparatus.

14. The information processing apparatus according to claim 13, wherein the notification device is a LED, the first control circuit notifies of the failure by controlling the LED from a turned-off state to a turned-on state.

15. The information processing apparatus according to claim 9, wherein
a third storage circuit that stores a third program, wherein the plurality of blocks includes a third block having a third module circuit reading the first program from the first storage circuit, a fourth module circuit reading the second program from the second storage circuit, and a fifth module circuit reading the third program from the third storage circuit, and the first control circuit causes the clock control circuit to supply a third module circuit clock to the third module circuit and a fourth module circuit clock to the fourth module circuit of the third block, and to not supply a fifth module circuit clock to the fifth module circuit of the third block.

16. The information processing apparatus according to claim 9, wherein the plurality of blocks includes a fourth block having a sixth module circuit executing a predetermined processing to data to be processed in the information processing apparatus, the first control circuit causes the clock control circuit to not supply a sixth module circuit clock to the sixth module circuit of the fourth block.

17. A control method of an information processing apparatus, the information processing apparatus comprising:

a first storage circuit that stores a first program;

a second storage circuit that stores a second program;

a notification device that notifies a user of information;

a first control circuit that executes the first program stored in the first storage circuit, and performs a verification of validity of the second program stored in the second storage circuit;

a second control circuit that executes the second program after it is determined to be valid as a result of the verification by the first control circuit;

a power supply control circuit that controls supply of power to a plurality of blocks including a first block having a first module circuit and a second module circuit, the first module circuit used for the verification by the first control circuit and controlling a notification by the notification device based on the verification by the first control circuit, and the second module circuit not used for the verification by the first control circuit; and a clock control circuit that controls supply of at least one module circuit clock to a corresponding module circuit of a plurality of module circuits, the plurality of module circuits included in the plurality of blocks, wherein the control method comprises:

while the second program is verified by the first control circuit, causing, by the first control circuit, the power supply control circuit to supply power to the first block, the first block including the first module circuit used for the verification by the first control circuit, and to not supply power to a second block, the second block not being used for the verification by the first control circuit, among the plurality of blocks, and causing, by the first control circuit, the clock control circuit to supply a first module circuit clock to the first module circuit of the first block and to not supply a second module circuit clock to the second module circuit of the first block.

18. A control method of an information processing apparatus, the information processing apparatus comprising:

a first storage circuit that stores a first program;

a second storage circuit that stores a second program;

a notification device that notifies a user of information;

a first control circuit that executes the first program stored in the first storage circuit, and performs a verification of validity of the second program stored in the second storage circuit;

a second control circuit that executes the second program after it is determined to be valid as a result of the verification by the first control circuit; and a clock control circuit that controls supply of at least one module circuit clock to a corresponding module circuit of a plurality of module circuits, the plurality of module circuits included in a plurality of blocks, the plurality of blocks including a first block having a first module circuit and a second module circuit, the first module circuit used for the verification by the first control circuit and controlling a notification by the notification device based on the verification by the first control circuit, and the second module circuit not used for the verification by the first control circuit, wherein the control method comprises:

while the second program is verified by the first control circuit, causing, by the first control circuit, the clock control circuit to supply a first module circuit clock to the first module circuit of the first block and to not supply a second module circuit clock to the second module circuit of the first block.

* * * * *